Figure 1:
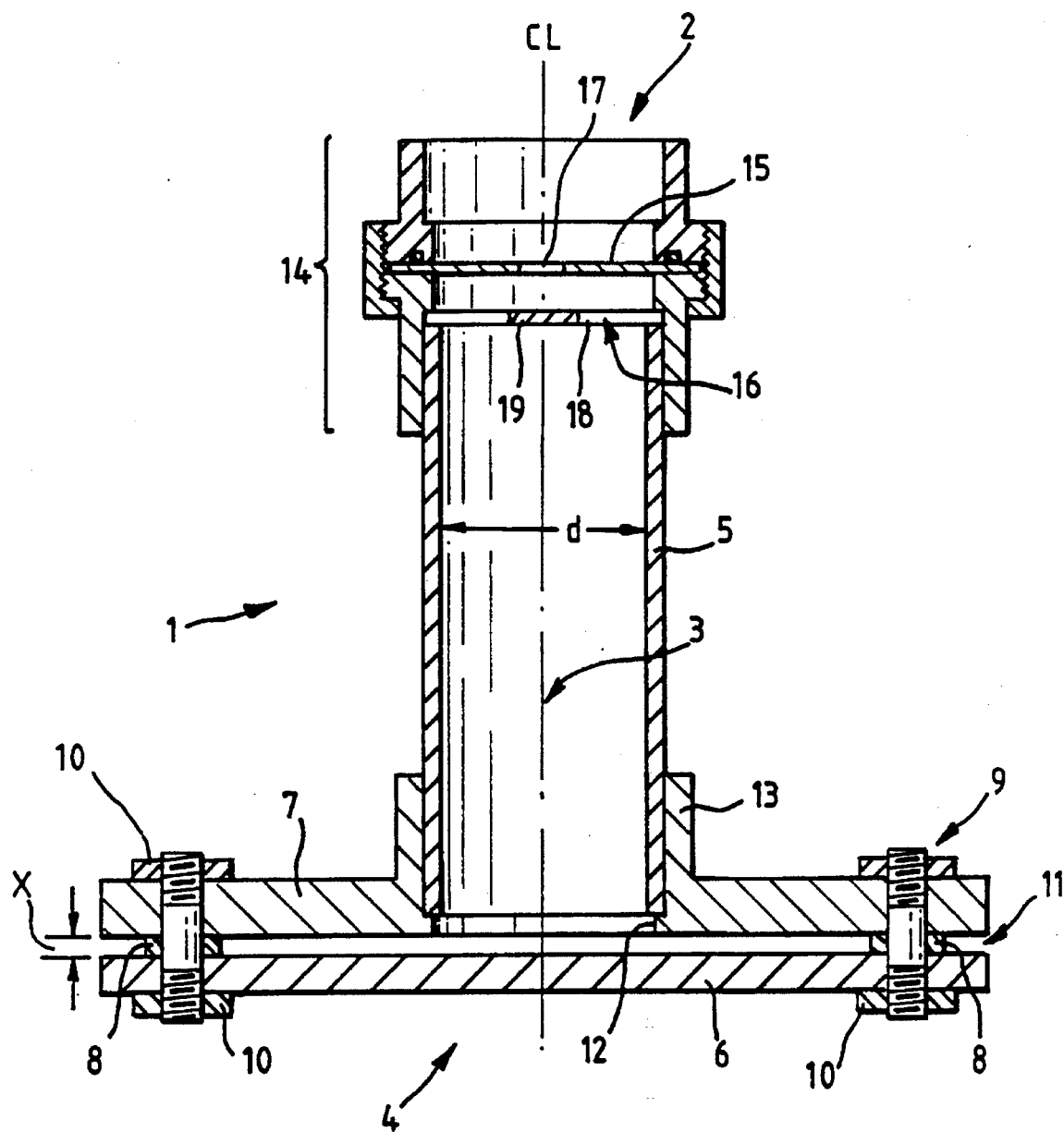

United States Patent [19]

Eades et al.

[11] Patent Number: 5,505,881
[45] Date of Patent: Apr. 9, 1996

[54] NOZZLE AND METHOD OF USE

[76] Inventors: Andrew Eades, 75 Penyston Road, Maidenhead, Berks SL6 6ED, England; Grant A. Ockleston, 271A High Street, Acton Town, Acton London, England

[21] Appl. No.: 360,752

[22] Filed: Mar. 20, 1995

[30] Foreign Application Priority Data

Jun. 25, 1992 [GB] United Kingdom .................. 9213513

[51] Int. Cl.⁶ ................................................ B01F 3/04
[52] U.S. Cl. ................................................ 261/76; 261/123
[58] Field of Search ........................................ 261/76, 123

[56] References Cited

U.S. PATENT DOCUMENTS

| | | | |
|---|---|---|---|
| 3,278,170 | 10/1966 | Moritz | 261/123 |
| 3,467,072 | 9/1969 | Toesca | 261/76 |
| 4,282,172 | 8/1981 | McKnight | 261/76 |
| 4,322,292 | 3/1982 | Knox | 261/76 |
| 5,156,458 | 10/1992 | Hemrajani et al. | 261/123 |

FOREIGN PATENT DOCUMENTS

| | | |
|---|---|---|
| 0364678 | 4/1990 | European Pat. Off. . |
| 7806420 | 1/1979 | Netherlands . |
| 1444027 | 7/1976 | United Kingdom . |
| 2108858 | 5/1983 | United Kingdom . |

*Primary Examiner*—Tim R. Miles
*Attorney, Agent, or Firm*—Chilton, Alix & Van Kirk

[57] ABSTRACT

The invention relates to apparatus (1) for distributing a gas in a liquid, particularly for "floating" particulate matter from raw or flocculated sewage, comprising an inlet (2) for a gas entrained in a liquid carrier such as recycled sewage, a sinuous part (16, 18) of a flow path (3) through the apparatus, and a downstream outlet (4, 11) of substantially uniform cross section adapted to allow gas to be released from the liquid carrier and to be dispersed laterally of the flow path (3).

16 Claims, 2 Drawing Sheets

1

NOZZLE AND METHOD OF USE

This application is a 371 of PCT/GB93/01076 May 25, 1993.

The invention relates to a nozzle, particularly such a nozzle as comprises or is apparatus for distributing a gas in a liquid, and for use in a method of distributing a gas in a liquid.

It is often necessary to treat a body of liquid such as sewage to remove algae and turbidity (solids content) prior to filtration. Thus to enable a relatively economic high rate of filtration particularly during algal "blooms" for example in summer months, it is necessary to remove solids prior to passage through a filter as such "blooms" can rapidly "clog" a filter medium and render it inoperative. One way to seek to achieve this treatment is counter-current dissolved air flotation in which a total flow of sewage liquid (water) to be treated passes through a continuously maintained bed of microscopic bubbles of a suitable gas, usually air above the filter medium. The air bubbles attach themselves to insoluble particles, colloids and the like in the sewage being treated, and by effectively modifying the buoyancy of the solids etc., cause them to float to the surface, where they can be removed, as scum, as and when desired.

In order to introduce dissolved air, it is usually introduced through nozzles. However, in order to produce the required release of microscopic air bubbles, the nozzles have necessarily a fine aperture which aperture is readily clogged by growing algae or solids in the liquids. Also, a great number of such nozzles is required in order to provide a required "blanket" of bubbles of the required size. This is therefore expensive in "down time" for cleaning, and capital cost, associated with the distribution pipework.

It is an object of the invention to seek to mitigate these disadvantages.

According to a first aspect of the invention there is provided nozzle apparatus for discharging gas entrained in a liquid into a liquid to introduce fine bubbles of gas into that liquid, comprising an elongate body defining a flow path which, adjacent an inlet to the body for the liquid with pressurised gas entrained therein, has a sinuous path longitudinally of the body defined by two plate means extending across the body, characterised by one plate means having a through orifice and by the other plate means having a blank portion, by the orifice and blank portion being substantially aligned axially of the body so as to define the sinuous path, and by the body having a substantially annular outlet for said liquid with pressurised gas entrained therein which outlet has a substantially uniform cross-section which is laterally displaced from the inlet.

The outlet may be over substantially 360°, and preferably the outlet may comprise a slot. This provides a particularly simple yet efficient construction.

The slot may be defined between two further spaced apart substantially parallel plates. This is a relatively inexpensive construction particularly where there are plates spaced apart by spacer means such as a washer or washers which may be varied in thickness to provide different slot widths.

One plate may have a roughened surface whereby to enhance release of gas. This is particularly efficient.

The plate may alternatively be spaced apart via support means, particularly a spindle suspended from a plate. This provides a relatively simple arrangement which does not interfere with flow distribution, nor provide dead zones with no dissolved air.

The orifice and blank portion, which is within an annular passage, may be disposed substantially centrally of the body.

According to a second aspect there is provided filter apparatus for sewage, including apparatus as hereinbefore defined.

According to a third aspect of the invention there is provided a method of distributing a gas in a liquid, comprising providing a body of liquid in a vessel, providing a source of liquid with gas entrained therein, providing nozzle apparatus as hereinbefore defined which provides entry of liquid containing gas into the body of liquid at a relatively high velocity, acts on the gas and liquid to slow its velocity, changes its direction of flow, and releases its entrained gas into the body of liquid in the vessel.

The step of changing direction may comprise turning the flow direction through substantially 90°, that is laterally of the main flow path.

The direction changing step and the gas release step may comprise impinging the liquid and gas on diffuser plate means, which may include providing enhanced nucleation means for the gas adjacent the diffuser plate means. This provides for a release of bubbles of different sizes, so enhancing flotation in use.

It will be understood that this invention extends to a body of liquid such as sewage whenever treated by a method as hereinbefore defined.

Nozzles embodying the invention are hereinafter described, by way of example, with reference to the accompanying drawings.

Figure 2:
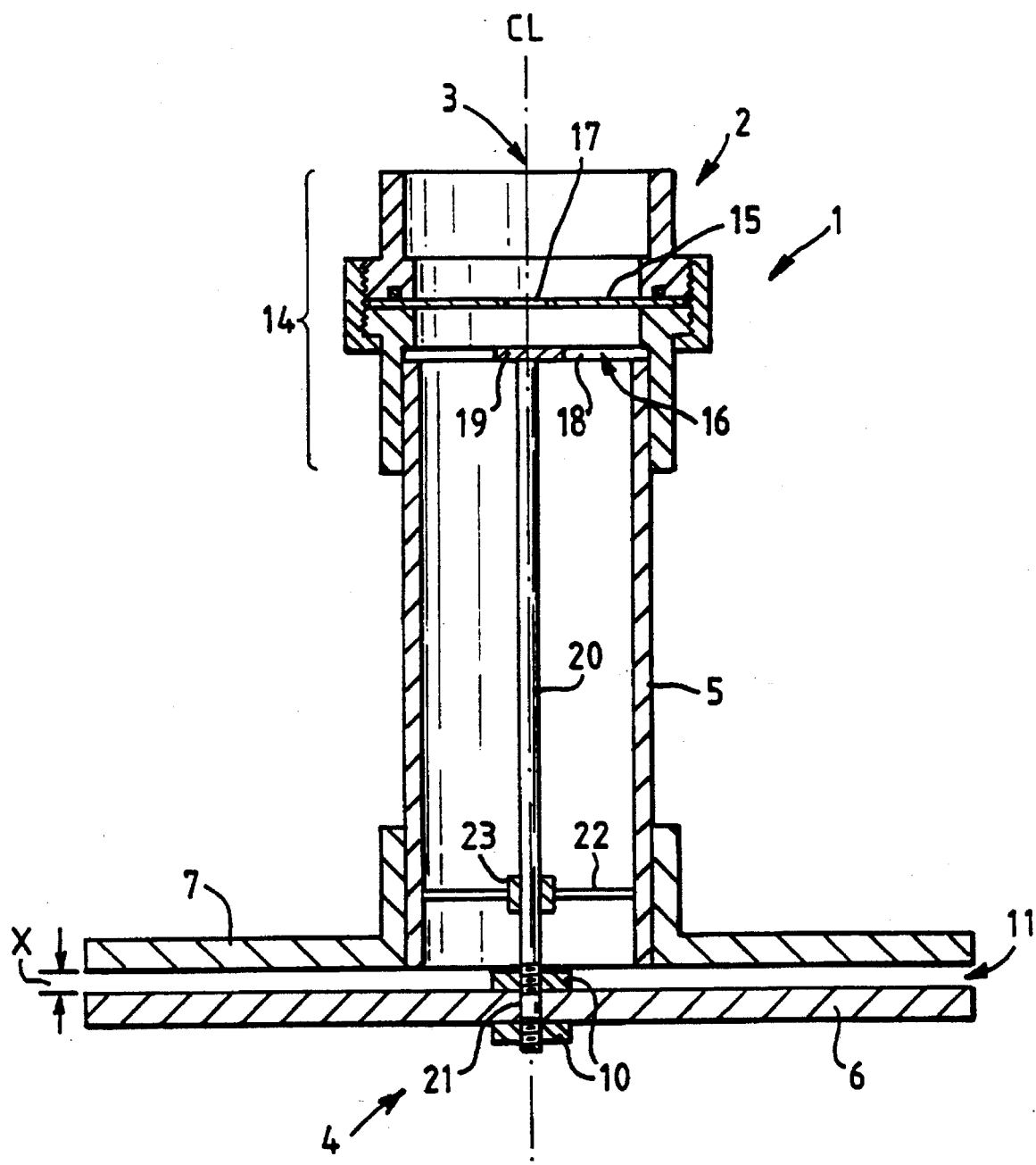

FIG. 1 shows a first embodiment of nozzle according to the invention, in longitudinal section; and FIG. 2 shows a view similar to FIG. 1 of a second embodiment of nozzle according to the invention.

Referring to the drawings in which like parts are referred to by like reference numerals, there is shown nozzle apparatus for discharging gas entrained in a liquid into a liquid to introduce fine bubbles of gas into that liquid, comprising an elongate body defining a flow path which, adjacent an inlet to the body for the liquid with pressurised gas entrained therein, has a sinuous path longitudinally of the body defined by two plate means extending across the body, characterised by one plate means 15 having a through orifice 17 and by the other plate means 16 having a blank portion 19, by the orifice 17 and blank portion 19 being substantially aligned axially of the body 5 so as to define the sinuous path, and by the body 5 having a substantially annular outlet 11 for said liquid with pressurised gas entrained therein which outlet 4 has a substantiahy uniform cross-section which is laterally displaced from the inlet 2.

The apparatus in the form of nozzles 1 shown can be used in any disposition in a body of sewage. For simplicity, the first embodiment shown in FIG. 1 is referred to in detail, the invention being such that even with the outlet 4 directed upwardly in use there is no propensity to clog either with algae or solids in suspension in the sewage. To achieve this, the nozzle 1 comprises the body, or shroud, 5 which is cylindrical and has the inlet 2 at one end and the outlet 4 at the other end. The outlet 4 comprises two spaced substantially circular plates 6 and 7 which are spaced apart by spacers 8 and which are secured together through the spacers 8, which are in the form of washers, by a nut and bolt arrangement 9 including a locking nut 10. The outlet 4 thus comprises a circular slot 11 between the superposed circumferential peripheries of the two plates 6 and 7. The width 'X' of the slot 11 can be adjusted by use of different thicknesses of washer 8.

The upper (as viewed) plate 7 has an annular shoulder or seat 12 in which the lower (as viewed) end of the shroud 5 is received, there being an upper extension sleeve 13 which supports the shroud 5 in a vertical (as viewed) position.

The inlet 2 for liquid and entrained air comprises an assembly 14 mounted on the top (in use) end of the shroud 5. The sinuous path through the inlet comprises the two spaced apart plates 15, 16 the upstream one 15 of which has the orifice 17 which is substantially centrally located and the lower one 16 of which has a lateral annular passage 18 and a substantially central blank portion or plate 19 on which the incoming liquid and entrained gas impinge to dissipate energy and begin the release of the air.

Referring now to FIG. 2, the embodiment of apparatus in the form of a nozzle 1 shown therein is virtually identical to that of the embodiment of FIG. 1 and operates in the same way to provide an air bubble blanket. The difference is in the construction of the lower (as viewed) spreader plate 6 which is supported substantially centrally of the nozzle 1 on an elongate support means in the form of a spindle 20 which itself is part of, and depends from, the central impingement plate 19. The spindle 20 passes through an orifice 21 in the plate 6 and is secured thereto by a locking device in the form of locking nuts 10. In order to prevent oscillation of the spindle 20 and hence of the plate 6, there is within the shroud 5 a collar or spider 22 braced against the inner (as viewed) surface of the shroud 5 and having a boss or bore 23 through which the spindle passes with a close fit. This construction and arrangement allows the lower or spreader plate 6 to be positioned accurately, with substantially no obstruction to the radial flow pattern at all. Both embodiments provide a very good dissolved air "spread". Stated in another way, the setting of the outlet 11 gap 'X' is achieved by a mechanical connector 8, 10 or 10, 21 which does not interfere with flow distribution of water saturated With air out of the nozzle 1, so that there are no dead zones with no dissolved air.

In use, the nozzle apparatus 1 of FIG. 1 or FIG. 2 are used either singly or with one or more others depending on the size of vessel and hence volume of sewage being treated.

The treatment liquid can be recycled sewage or water with entrained air, or water with entrained air, the air usually being dissolved therein by use of a saturator through which the sewage or water passes. In doing so, air is dissolved in the sewage or water.

In both embodiments the liquid and dissolved air enter the inlet 2, pass the sinuous path then pass along the shroud 5 on path 3 to impinge on the spreader plate 6 which also deflects the stream laterally of, in this case at 90° to, the path 3 through the nozzle 1 i.e. at 90° to the longitudinal axis $C_L$ of the shroud 5. The air comes out of solution in the form of a cloud of bubbles of varying microscopic dimension, and exits the slot 11 laterally of the shroud 5 over substantially 360° to provide a blanket of microscopic bubbles in the sewage across the whole surface area of a treatment vessel for the sewage, the force of the steam of liquid and air through the slot 11, automatically keeping it unblocked by solids settling therein or algae growing therein or thereon. The microscopic bubbles of air attach themselves to particulate matter in the sewage, the air and sewage flowing in counter-current relation, thereby providing a greater particle/bubble contact than hitherto so that the particles float to the surface as a scum for later removal.

The invention thus results in a phase change of the air from being dissolved to the gaseous state, and moreover provides a laterally projected cloud of bubbles which can reach the whole of the cross-sectional area and depth of a vessel containing the sewage to be treated, and hence substantially all the sewage is subject to flotation treatment.

The inner surface of the lower (as viewed) plate 6 may, in each embodiment, be roughened as by being pitted, grooved or serrated and this provides nucleation points which enhance the formation of bubbles of air with a distribution of bubble size so that the air curtain formed in the sewage has a variety of microscopic bubble sizes so that enhanced flotation of algae and solids ensues.

Typically, the width 'X' of the slot 11 is of the order of 3 mm, suitably 4 mm for flow rates of water saturated with air of between 4 m$^3$/hr and 6 m$^3$/hr.

We claim:

1. Nozzle apparatus for discharging gas entrained in a liquid into a liquid to introduce fine bubbles of gas into that liquid, comprising an elongate body defining a flow path which, adjacent an inlet to the body for the liquid with pressurised gas entrained therein, has a sinuous path longitudinally of the body defined by two plate means extending across the body, characterised by one plate means (15) having a through orifice (17) and by the other plate means (16) having a blank portion (19), by the orifice (17) and blank portion (19) being substantially aligned axially of the body (5) so as to define the sinuous path, and by the body (5) having a substantially annular outlet (11) for said liquid with pressurised gas entrained therein which outlet (4) has a substantially uniform cross-section which is laterally displaced from the inlet (2).

2. Nozzle apparatus according to claim 1, characterised by the outlet (4) being over substantially 360°.

3. Nozzle apparatus according to claim 2, characterised by the outlet (4) comprising a slot (11).

4. Nozzle apparatus according to claim 3, characterised by the slot (11) being defined between two further spaced apart substantially parallel plates (6, 7).

5. Nozzle apparatus according to claim 4, characterized by a plate (6) or (7) having a roughened surface whereby to enhance release of gas.

6. Nozzle apparatus according to claim 4, characterised by the plates (6, 7) being spaced apart via a support means (20, 22).

7. Nozzle apparatus according to claim 6, characterised by the support means (20, 22) comprising a spindle (20) suspended from a plate (16).

8. Nozzle apparatus according to claim 7, characterised by the orifice (17) and the blank portion (19), within an annular passage (18), being disposed substantially centrally of the body (5).

9. Nozzle apparatus according to claim 4, characterised by the plates (6, 7) being spaced apart by spacer means (8).

10. Nozzle apparatus according to claim 9, characterized by a plate (6) or (7) having a roughened surface whereby to enhance release of gas.

11. Nozzle apparatus according to claim 9, characterised by the spacer means (8) varying in thickness whereby the slot (11) is adjustable in width.

12. Nozzle apparatus according to claim 11, characterized by a plate (6) or (7) having a roughened surface whereby to enhance release of gas.

13. A method of distributing a gas in a liquid, comprising providing a body of liquid in a vessel, providing a source of liquid with gas entrained therein, characterised by providing nozzle apparatus (1) according to any preceding claim which provides entry of liquid containing gas into the body of liquid at a relatively high velocity, acts on the gas and liquid to slow its velocity, changes its direction of flow and releases its entrained gas into the body of liquid on the vessel.

14. A method according to claim 13, characterised by the step of changing direction comprising turning the flow direction through substantially 90°.

15. A method according to claim 14, characterised by the direction changing step and the gas release step comprising impinging the liquid and gas on a diffuser plate means.

16. A method according to claim 15, characterised by the gas release step including providing enhanced nucleation means for the gas adjacent the diffuser plate means.

* * * * *